United States Patent
Kroesen

(10) Patent No.: US 9,072,405 B2
(45) Date of Patent: Jul. 7, 2015

(54) FULLY AUTOMATIC ELECTRIC COFFEE MAKER

(75) Inventor: Klaus Kroesen, Xanten (DE)

(73) Assignee: SEVERIN ELEKTROGERAETE GMBH, Sundern (DE)

( * ) Notice: Subject to any disclaimer, the term of this patent is extended or adjusted under 35 U.S.C. 154(b) by 271 days.

(21) Appl. No.: 13/515,423

(22) PCT Filed: Feb. 4, 2010

(86) PCT No.: PCT/DE2010/075011
§ 371 (c)(1),
(2), (4) Date: Jul. 3, 2012

(87) PCT Pub. No.: WO2011/095147
PCT Pub. Date: Aug. 11, 2011

(65) Prior Publication Data
US 2012/0285332 A1 Nov. 15, 2012

(51) Int. Cl.
*A47J 31/00* (2006.01)
*A47J 31/44* (2006.01)
*A47J 31/60* (2006.01)

(52) U.S. Cl.
CPC . *A47J 31/44* (2013.01); *A47J 31/60* (2013.01)

(58) Field of Classification Search
CPC ... A47J 31/60; A47J 31/0663; A47J 31/3619; A47J 31/3614
USPC .............. 99/289 R, 290, 286, 302 R
See application file for complete search history.

(56) References Cited

U.S. PATENT DOCUMENTS

| 5,957,033 | A | * | 9/1999 | In-Albon | 99/284 |
| 6,599,546 | B2 | * | 7/2003 | Palaniappan | 426/231 |
| 2002/0083842 | A1 | * | 7/2002 | Kown | 99/290 |
| 2009/0139978 | A1 | | 6/2009 | Ha | |
| 2010/0018606 | A1 | | 1/2010 | Yacou | |
| 2010/0107887 | A1 | | 5/2010 | Bentley | |
| 2010/0112152 | A1 | | 5/2010 | Sinnema et al. | |
| 2014/0106042 | A1 | * | 4/2014 | Nosler et al. | 426/433 |

* cited by examiner

*Primary Examiner* — Reginald L Alexander
(74) *Attorney, Agent, or Firm* — Andrew Wilfrod

(57) ABSTRACT

In order to create a fully automatic electric coffee maker, at least comprising a housing (1) having a water tank (12), a water pump, a brewing unit (2), controls, an electrical controller (3), and a collecting container (4) for coffee remains (5) or used coffee grounds, possibly having a bean container (6) and a grinding assembly (7), wherein the formation of mildew is substantially or completely prevented, the fully automatic electric coffee maker being cheap and easy to produce and having a long operating life, at least one UV light source (8, 11, 13, 14, 15) is arranged on the housing (1) or inside the housing (1) in such a way that the parts of the fully automatic coffee machine in contact with used coffee grounds or coffee remains (5) and/or the coffee remains (5) or the used coffee grounds and/or the bean container (6) and/or the grinding assembly (7) and/or the water tank (12) and/or a connecting line between the water tank (12) and the water pump or the brewing unit (2) is or can be irradiated with ultraviolet light beams.

12 Claims, 1 Drawing Sheet

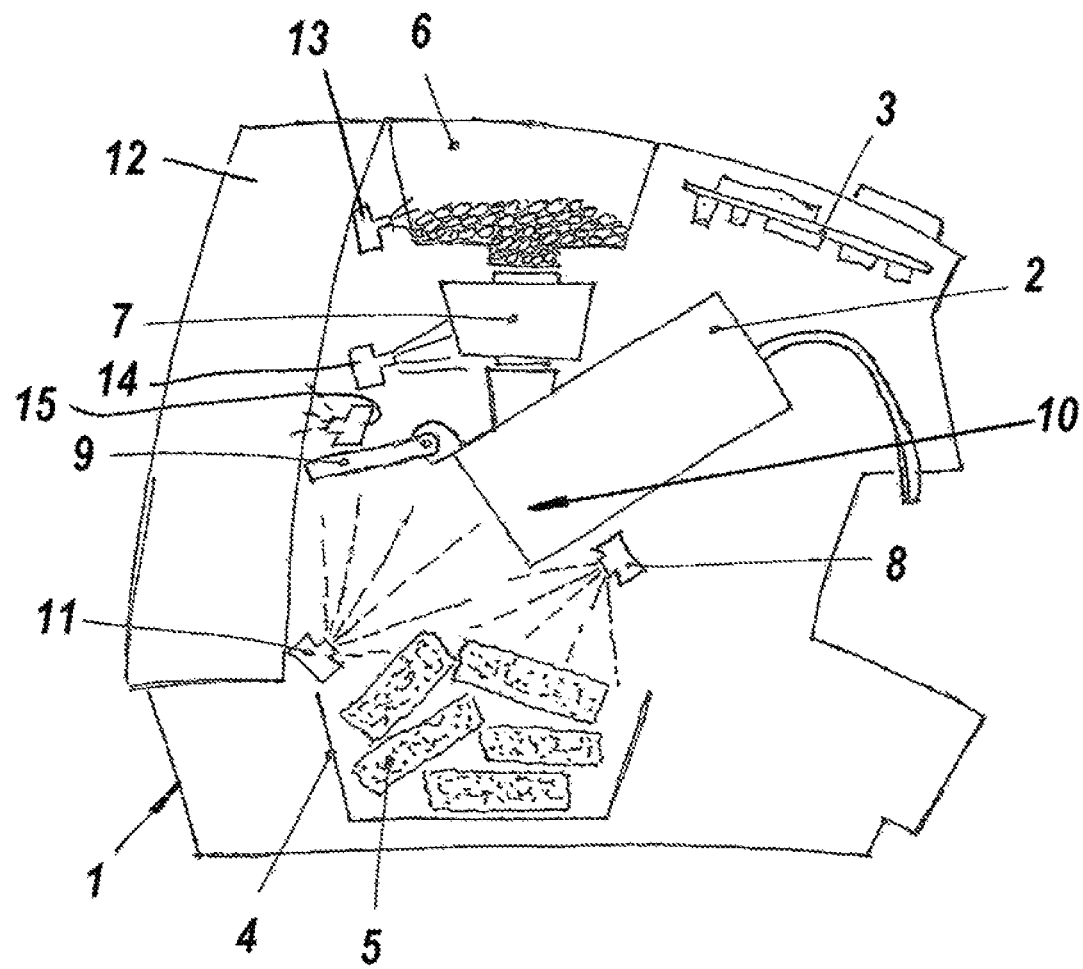

FULLY AUTOMATIC ELECTRIC COFFEE MAKER

CROSS REFERENCE TO RELATED APPLICATIONS

This application is the US-national stage of PCT application PCT/DE2010/075011 filed 4 Feb. 2010, published 11 August 2011 as WO2011/095147, and claiming the priority of PCT patent application PCT/DE2010/075011 itself filed 4 Feb. 2010.

FIELD OF THE INVENTION

The invention relates to a fully automatic electric coffee maker, comprising a housing including a water reservoir, a water pump, a brewing unit, control elements, an electrical controller means, and a collection container for the ground coffee residue or coffee grounds, optionally including a bean hopper and a grinder.

BACKGROUND OF THE INVENTION

Fully automatic coffee makers of this type are widely known in the art. Fully automatic coffee makers provide the consumer with a wide variety of coffee beverages, such as for example cappuccino, espresso, caffe latte and similar beverages composed primarily of coffee and milk. To accomplish this, fully automatic coffee makers of this type are supplied with coffee in the form of coffee beans in a bean hopper. In order to prepare the hot beverage, the beans are ground in a grinder and then transferred to a brewing unit comprising a brewing unit. Once the brewing operation for the hot beverage has ended, the ground coffee residue, also called grounds, coming from the brewing unit or brewing unit are discharged into a collection container that is typically provided thereunder. The ground coffee residue then remains therein until the next manual emptying/cleaning by the user.

If cleaning is inadequate, or if the ground coffee residue remains for an extended period inside the collection container, it is possible for mold to form. This spreads rapidly and is sometimes a health hazard. In the case of fully automatic coffee makers of the type referenced above, the mold forms on the ground coffee residue and/or on the parts of the fully automatic coffee maker impinged upon by the ground coffee residue if such cleaning has been inadequate.

Previously, the formation of mold could be prevented inside the fully automatic coffee maker only by requiring the consumer to clean the collection pan of the collection container thoroughly and on a daily basis. However, the user frequently neglects to do this.

Another source of mold can be created by the actual coffee beans since experience has shown that a high percentage of the coffee beans contain mold spores. The water needed to brew a brewed beverage can also be contaminated with mold spores.

OBJECTS OF THE INVENTION

In light of the prior art described above, the object of this invention is to provide the capability of destroying the mold inside the fully automatic coffee maker so that the formation of mold is largely or completely prevented, the invention being inexpensive and simple to manufacture, and having a long service life.

SUMMARY OF THE INVENTION

In order to achieve this object, the invention proposes an approach whereby at least one UV light source is provided in the housing or inside the housing in such a way that the parts of the fully automatic coffee maker in contact with the ground coffee residue or coffee grounds, and/or the bean hopper, and/or the grinder, and/or the water tank, and/or a connecting conduit between water tank and water pump or brewing unit, are irradiated or can be irradiated with ultraviolet light.

Irradiating the ground coffee residue with UV light completely suppresses the growth of mold, or forming only at a significantly lower level, and this has a very positive effect on the hygienic state of the coffee maker. As a result, the formation of mold is largely avoided or prevented even if the user has neglected to clean the fully automatic coffee maker. The UV light source is provided here in such a way that all of the ground coffee residue or the parts of the in contact with the ground coffee residue are irradiated with ultraviolet light.

In addition, by irradiating the bean hopper with UV light mold spores or the like can be destroyed on the coffee beans in the bean hopper. By irradiating the grinder with ultraviolet light, destruction of the spores or mold is achieved, the content of the grinder being irradiated at the outlet of the grinder, that is, at the discharge opening for the ground material. An appropriate ultraviolet light source can also be provided on the connecting conduit between the water tank and the water pump or the brewing unit so as to eliminate any contamination with spores or the like. The water tank itself can also be irradiated with ultraviolet light in order to remove mold spores or the like from the water therein.

In particular, provision can preferably be made whereby the brewing unit includes an opening closable by a discharge gate to discharge the ground coffee residue or coffee grounds, such that the inside of the discharge gate defining the brewing chamber is irradiated with ultraviolet light when the gate is in the open position to discharge the ground coffee residue or the coffee grounds.

Since it is possible, in particular, for ground coffee residue to remain behind inside the brewing chamber or on the inside of the discharge gate of the brewing unit after the brewing process has ended, at least one of the UV light sources is provided in such a way that the inside of the discharge gate in the open position and the brewing chamber can be irradiated with UV light.

In addition, provision can be made whereby two UV light sources are provided inside the housing such that the first UV light source irradiates the contents of the collection container, while the second light source irradiates the inside of the discharge gate and parts of the brewing chamber of the brewing unit.

This location of two UV light sources inside the housing provides a complete or nearly complete irradiation both of the ground coffee residue as well as parts of the brewing unit that come into contact with the ground coffee residue.

In order to ensure that the UV light source can be provided and installed outside the water tank or outside the grinder or outside the bean hopper or outside the bean grinder or outside the connecting conduit, while also ensuring that the contents therein are irradiated with UV light, provision is made whereby the water tank and/or the grinder and/or the bean hopper and/or the connecting line are composed at least partially of material transparent to UV light, and the UV light source is provided and attached outside the respective device or part in such a way that its light is directed into the device or part.

The respective UV light sources are provided inside the housing close to the respective element, that is, close to the water tank, grinder, bean hopper, or connecting line, the corresponding components being composed at least partially of material transparent to UV light, thereby enabling the externally provided UV light source to irradiate the content of the corresponding device part and to destroy mold spores or the like.

Depending on the mode of application, provision is made whereby at least one of the UV light sources is switched on permanently.

Provision can also be made whereby at least one of the UV light sources can be switched on and off by the operating switch of the fully automatic coffee maker.

Provision can preferably be made whereby at least one of the UV light sources can be switched on and off by the electronic control, in particular, by a time-controlled means, preferably by the electronic control of the fully automatic coffee maker.

Control can be implemented by an approach whereby irradiation by UV light is effected only when the fully automatic coffee maker is being used. Whenever the fully automatic coffee maker is not being used and has been switched, for example, to the standby position, the UV light source can also be switched off simultaneously. An intermittent operating mode is also possible for the UV light source if this is considered to be necessary.

In addition, provision can be made whereby the output of the UV light source can be adjusted or controlled.

Provision can especially preferably be made whereby a switch is inserted in the electrical circuit of at least one of the UV light sources, preferably all UV light sources, such that the switch interrupts the electrical circuit in response to opening a part used to close the housing, for example, a door.

This arrangement ensures that the UV light sources, which are normally shielded from the outside by the housing walls of the housing, are disabled whenever the housing has been opened, for example, by opening an installation or maintenance door. This thus prevents the user from being harmed by the UV light from the UV light source.

BRIEF DESCRIPTION OF THE DRAWING

The above and other objects, features, and advantages will become more readily apparent from the following description, reference being made to the accompanying drawing whose sole FIGURE is a diagrammatic vertical section through an automatic coffee maker according to the invention.

DETAILED DESCRIPTION

The drawing shows a fully automatic electric coffee maker. The fully automatic electric coffee maker comprises a housing 1 including a brewing unit 2, control elements, an electrical controller 3, and a collection container 4 for ground coffee residue 5. The fully automatic coffee maker in the embodiment includes a bean hopper 6 and a grinder 7 to prepare hot coffee beverages, as well as a water tank 12, and an unillustrated valve or pump for dispensing the water.

UV light sources 8, 11, 13, 14, 15 are provided according to the invention inside the housing 1 in such a way that the parts of the fully automatic coffee maker in contact with coffee grounds or ground coffee residue 5, and/or ground coffee residue 5 or coffee grounds are irradiated or can be irradiated with ultraviolet light, and as can similarly the coffee beans in the bean hopper, the ground material in the grinder 7, or the ground material discharged from this mechanism, the water in the tank 12, and possibly the water in a connecting line between the water tank 12 and the brewing unit 2.

The brewing unit 2 includes an opening closable by a discharge gate 9 to discharge ground coffee residue 5. When in the open position, the inside of the discharge gate 9 that defines a brewing chamber 10 is irradiated with ultraviolet light.

Two UV light sources 8 and 11 are provided inside the housing 1 in the embodiment of FIG. 1. The first UV light source 8 irradiates the contents of the collection container 4, while the second light source 11 irradiates the inside of the discharge gate 9 and parts of the brewing chamber 10 of the brewing unit 2. As a result, all parts of the fully automatic coffee maker that come in contact with ground coffee residue 5 as well as the ground coffee residue 5 inside the collection container 4 after discharge are irradiated with UV light. As a result, the formation of mold inside the fully automatic coffee maker is completely or nearly completely suppressed.

In addition, the UV light source 13 is provided on the bean hopper 6, the UV light source 14 is provided on the grinder 7, and the UV light source 15 is provided on the water tank 12, to which end these parts of the apparatus are composed at least in the zone of the UV light of material that is transparent to UV light.

The UV light sources 8, 11, 13, 14, 15 are time-controlled by the electrical controller 3 of the fully automatic coffee maker in order to ensure that the irradiation by UV light is sufficient. As a result, the time of irradiation can be adjusted in particular to the use of the fully automatic coffee maker.

The location of these UV light sources 8, 11, 13, 14, and 15 inside the housing 1 of the fully automatic coffee maker provides an inexpensive and simple way to prevent the formation of mold inside the fully automatic coffee maker. It enables the growth of pathogenic mold inside the fully automatic coffee maker to be suppressed completely or nearly completely, in particular if the user has been negligent in cleaning the fully automatic coffee maker The invention is not restricted to the illustrated embodiment but can be varied in multiple ways within the scope of the disclosure.

All of the novel individual features and combined features disclosed in the description and/or the drawing are considered essential to the invention.

The invention claimed is:

1. A fully automatic electric coffee maker comprising:
   a housing,
   a water tank in the housing,
   a water pump in the housing,
   a brewing unit in the housing including an opening,
   a discharge gate in the brewing unit and movable into an open position to discharge therefrom, through the opening ground-coffee residue or coffee grounds,
   an electrical controller,
   a collection container in the housing for receiving the ground coffee residue or coffee grounds, and
   at least one UV light source on or inside the housing for irradiating with UV light the the inside of the discharge gate in the open position thereof.

2. The fully automatic electric coffee maker, according to claim 1, wherein the water tank or a connecting line are composed at least partially of material that is transparent to UV light, and the UV light source is provided and attached outside the respective device or part in such a way that its light is directed into the device or part.

3. The fully automatic electric coffee maker according to claim 1, wherein at least one of the UV light sources is switched on permanently.

4. The fully automatic electric coffee maker according to claims 1, wherein at least one of the UV light sources can be switched on and off by an operating switch of the fully automatic coffee maker.

5. The fully automatic electric coffee maker according to claim 1, wherein at least one of the UV light sources can be controlled and switched on and off by the controller of the fully automatic coffee maker.

6. The fully automatic electric coffee maker according to claim 1, wherein the output of at least one of the UV light sources can be adjusted or controlled.

7. A fully automatic electric coffee maker comprising:
a housing,
a water tank in the housing,
a water pump in the housing,
a brewing unit in the housing,
an electrical controller,
a collection container in the housing for the ground coffee residue or coffee grounds, and
at least one UV light source on or inside the housing, the parts of the fully automatic coffee maker in contact with the ground coffee residue or coffee grounds, or the water tank, or a connecting conduit between the water tank and the water pump or the brewing unit are or can be irradiated with ultraviolet light, and
first and second UV light sources inside the housing, the first UV light source irradiating the contents of the collection container, the second UV light source irradiating the inside of the discharge gate and parts of a brewing chamber of the brewing unit.

8. The fully automatic electric coffee maker according to claim 7, wherein the brewing unit includes an opening closable by a discharge gate to discharge the ground coffee residue or coffee grounds, the inside of the discharge gate defining the brewing chamber being irradiated with ultraviolet light when in the open position to discharge the ground coffee residue or the coffee grounds.

9. A fully automatic electric coffee maker comprising:
a housing,
a water tank in the housing,
a water pump in the housing,
a brewing unit in the housing,
an electrical controller,
a collection container in the housing for the ground coffee residue or coffee grounds,
at least one UV light source on or inside the housing, the parts of the fully automatic coffee maker in contact with the ground coffee residue or coffee grounds, or the water tank, or a connecting conduit between the water tank and the water pump or the brewing unit are or can be irradiated with ultraviolet light, and
a switch in the electrical circuit of at least one of the UV light sources to interrupt the electrical circuit in response to opening a part used to close the housing.

10. An automatic coffee maker comprising:
a housing;
a coffee supply;
a brewing unit in the housing;
a water tank in the housing;
a collection container in the housing;
means connected to the coffee hopper for feeding ground coffee from the supply and water from the tank to the brewing unit and for feeding used coffee grounds from the brewing unit to the container; and
at least one UV light source in the housing oriented to irradiate at least the collection container and any coffee grounds therein and thereby.

11. The automatic coffee maker defined in claim 10, wherein the supply includes a coffee hopper adapted to hold coffee beans and a grinder for grinding the beans into ground coffee.

12. The automatic coffee maker defined in claim 10, further comprising:
another UV light source irradiating the brewing unit and an outlet thereof.

* * * * *